Figure 1:
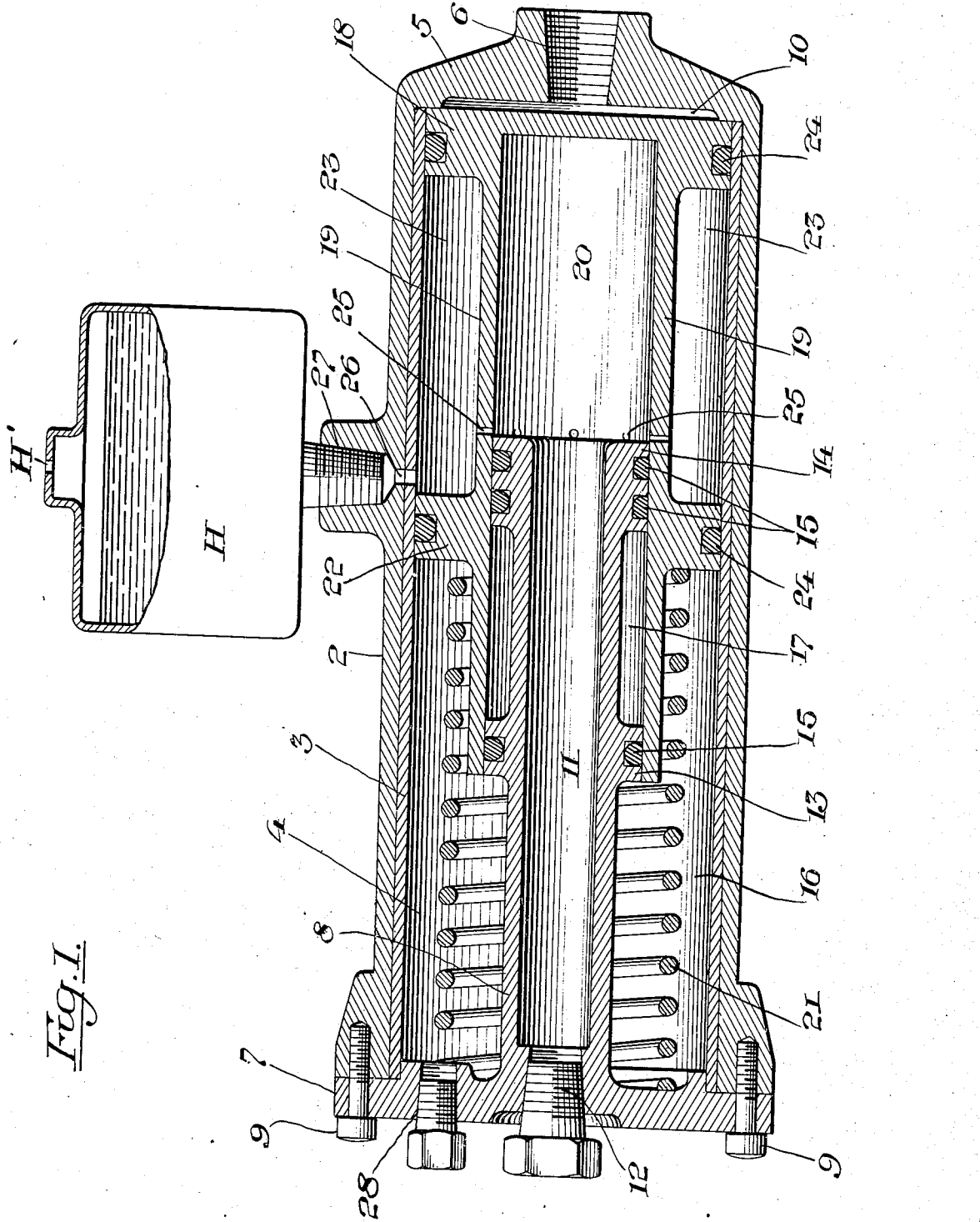

July 21, 1942.   N. A. CHRISTENSEN   2,290,537
PRESSURE BOOSTING CYLINDER
Filed Sept. 6, 1939   2 Sheets-Sheet 1

INVENTOR.
Niels A. Christensen
BY
ATTORNEY.

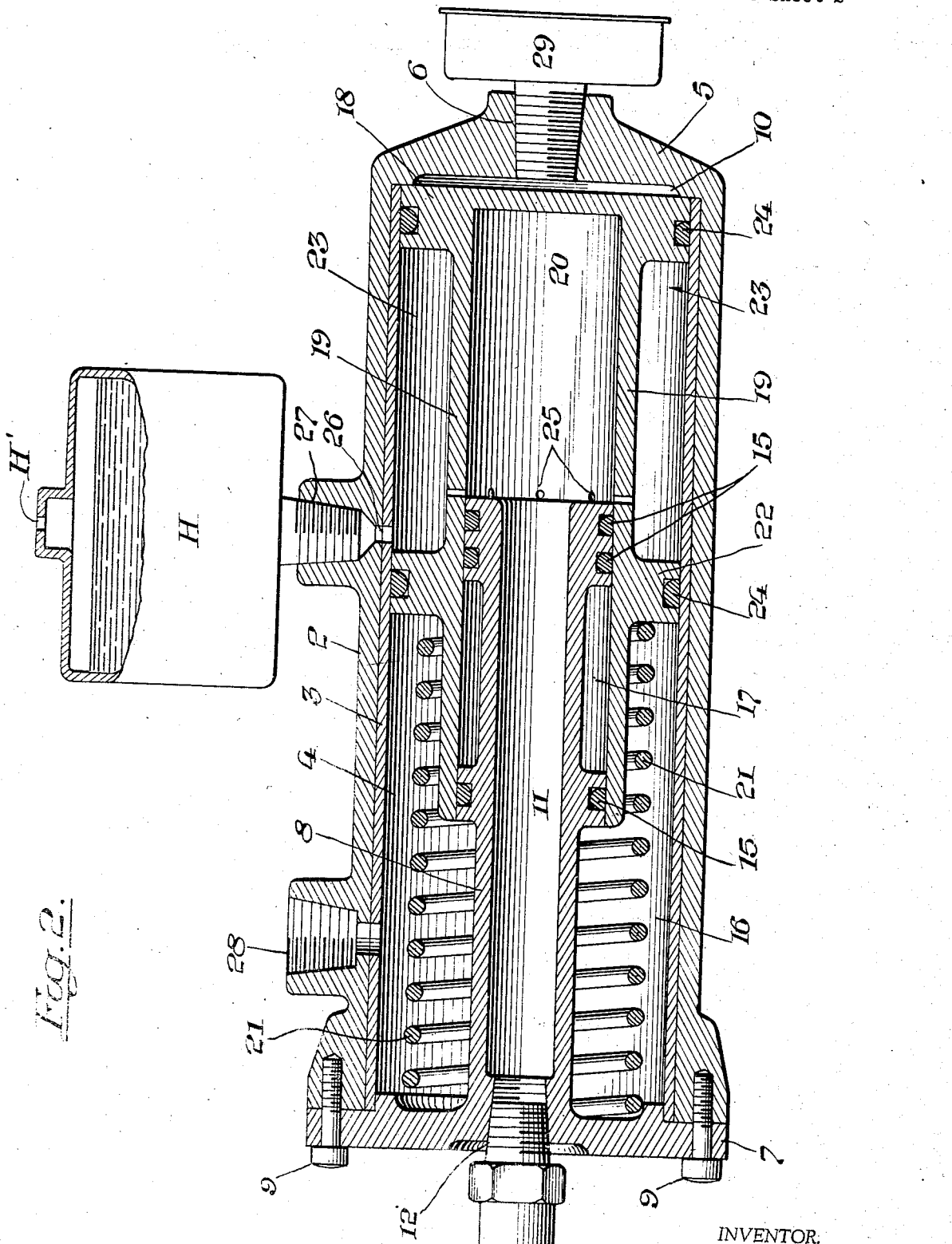

Patented July 21, 1942

2,290,537

UNITED STATES PATENT OFFICE 2,290,537

PRESSURE BOOSTING CYLINDER

Niels A. Christensen, Cleveland, Ohio

Application September 6, 1939, Serial No. 293,549

2 Claims. (Cl. 60—54.6)

This invention relates to a pressure boosting means or valve for hydraulic systems for aircraft and the like and while adaptable to any hydraulic brake system, it is particularly applicable to aircraft and other systems where the fluid pressure is to be raised and held constant. Therefore, the principal object of the present invention is the provision of an improved pressure raising means capable of receiving fluid at a lower pressure than that desired for use on brake cylinders and maintaining the pressure in the brake cylinder constant.

In certain types of airplanes the braking units require pressure from four hundred pounds per square inch upward and the pressure is derived from a low pressure source which may be either compressed air, vacuum or liquid such, for instance, as oil taken from the engine lubricating force feed system which usually has a pressure of from forty to sixty pounds per square inch and it, therefore, becomes necessary to step up this pressure for brake use. Hence, a further object of the present invention is the provision of a light weight boosting means, simple and inexpensive in construction and positive and efficient in operation.

In the drawings accompanying and forming a part of this specification, Fig. 1 is a longitudinal sectional view of this improved boosting means, and Fig. 2 is a similar view of a slightly modified form adapted for use with vacuum pressure.

Similar characters of reference indicate corresponding parts in the several views.

Before explaining in detail the present improvement and mode of operation thereof, I desire to have it understood that the invention is not limited to the details of construction and arrangement of parts illustrated in the accompanying drawings since the invention is capable of other embodiments, and that the phraseology employed is for the purpose of description and not of limitation.

This booster mechanism is placed between the brake cylinder and a metering control valve as is usual either in reducing or boosting mechanisms and reference is made to Fig. 6 of my application for pressure reducing means filed herewith for an illustration of this valve in the brake system.

Fig. 1 illustrates one form of this device for use with either liquid or compressed air and comprises a main casing or housing 2 within which and adjacent to the inner wall a shell or sleeve 3 is closely fitted and the casing 2, together with the sleeve 3 form the outer cylinder generally denoted by 4. At one end of this cylinder 4, as the inlet end, the casing 2 is closed by a part thereof as 5 and is provided with an inlet opening 6 which may be threaded or otherwise provided with means for attachment to the line leading from the pressure control valve. The other end of the cylinder 4 is closed by means of an enlarged head 7 of an interior stationary piston 8 and is secured to the casing 2 by suitable means such as the bolts 9.

The interior of the piston 8 has a bored passage or chamber 11 open at its inner end and in communication at its outer end with a threaded outlet opening 12 adapted to be secured to the line leading to the brake cylinder. The exterior portion of the piston is provided with outwardly extending flanges 13 and 14 for reception of suitable packing rings 15 and these extensions form the annular chambers 16 and 17.

Slidably located within the cylinder 4 is a piston 18 having a sleeve 19 forming the cylinder 20 which is the high pressure chamber between the piston and outlet 12. This cylinder 20 fits and slides over the piston 8 and the packing rings 15 make a tight fit preventing leakage of fluid. The piston 18 is provided with an outwardly extending flange 22 adapted to slide along the inner wall of the cylinder 4. This flange, together with the head of the piston 18 forms the annular chamber 23. The projection 22 and the head of the piston 18 are provided with suitable packing rings 24 to make a tight fit with the wall of the cylinder 4. A spring 21 is located between the enlarged end 7 of the piston 8 and the projection 22 of the piston 18. Between the head of the piston 18 and inlet 6, a working pressure fluid chamber 10 is provided within the cylinder 4. This in case of Fig. 1 would be low pressure compressed air or low pressure liquid but, in case of Fig. 2 it will be air at atmospheric pressure through breather 29 when a partial vacuum has been created by suction through the connection 28.

The sleeve portion 19 of the piston 18 forming the cylinder 20 is of suitable size to permit it readily to slide over the outwardly extending flanges 13 and 14 of the stationary piston 8, and this sleeve portion 19 is provided with laterally extending ports 25 located between the flange 22 and the head of the piston 18 and communicating with the cylinder 20 and chamber 23 when the ports are open as when the piston is in brake release position as illustrated. The cylinder 4 is provided with a port 26 opening into the chamber 23 at one end and to a threaded passage 27 in the casing 2 to which is secured a fluid reserve tank H having an air vent H'. An air vent 28 is provided in the end of the cylinder connecting the chamber 16 of the cylinder to the atmosphere.

The operation of the device is as follows:

With the brakes in released position, the parts are in the position illustrated in the drawings and fluid from the reserve tank H is permitted to flow through the port 26 in the chamber 23 and through the ports 25 into the cylinder 20 of the piston 18 thereby keeping the brake line filled with fluid.

The operator by means of the control valve passes low pressure fluid either air from an air tank or oil from the engine lubricating force feed system through the inlet 6, causing the piston 18 to shift toward the outlet end closing the piston ports 25 so that the cylinder 20 is no longer connected to the reservoir chamber 23 and entrapping fluid in the cylinder 20. Continued pressure on the piston 18 causes the piston to shift further toward the outlet forcing fluid to the brakes in a pressure boosted in proportion to the area of the cylinder 10 to the area of the cylinder 20 and this pressure may be held constant by the operator since the piston remains in balance in accordance with pressure exerted from the control valve to the pressure on the brakes. When the operator releases the pressure on the control valve, the spring 21 returns the piston to its original position again connecting the cylinder 20 to the reservoir chamber 23 and replenishing any necessary fluid in the cylinder 20 from the tank H.

It will be noted that the ports 25 are so positioned that, in full travel of the piston, they never pass beyond the packing ring 15 of the flange 13 of the stationary piston 8.

In the modified form shown in Fig. 2, the parts are the same and, therefore, have been given the same reference numerals, the only changes being that the air vent 28 is attached to the casing itself and is provided with suitable means for attachment of a vacuum line and, in this form, a suitable breather screen 29 is attached to the inlet 6 connecting the inlet with atmosphere.

The operation is the same except that vacuum or suction is exerted through the vent 28 to exhaust the air in the chamber 16 and the air pressure on the end of the piston 18 through the inlet 6 being greater than that in the chamber 16, causes movement of the piston toward the outlet to effect a boosting of pressure on the brakes, as hereinbefore explained in connection with Fig. 1.

It is to be understood that, by describing in detail herein any particular form, structure or arrangement, it is not intended to limit the invention beyond the terms of the several claims.

Having thus explained the nature of my said invention and described a way of constructing and using the same, although without attempting to set forth all of the forms in which it may be made or all of the modes of its use, I claim:

1. A self-contained pressure boosting means, comprising a cylinder having an inlet and outlet, a hollow low pressure piston having a pair of spaced flanges sliding on the walls of said cylinder and defining a shifting reservoir chamber between the cylinder and piston, said piston separating the inlet from the outlet and having ports between said reservoir and the interior of said piston, the interior of said piston forming a high pressure chamber, and a high pressure piston operating in the interior of said low pressure piston to close said ports when the low pressure piston is moved by pressure fluid entering the inlet and to open said ports when the low pressure piston returns to normal position to replenish the fluid supply in said high pressure chamber.

2. A self-contained pressure boosting means comprising a cylinder having an inlet and outlet in opposite ends thereof, a hollow primary piston shiftable in said cylinder and having a pair of spaced flanges provided with packing rings sliding on the walls of said cylinder to space the piston therefrom and to define a low air pressure chamber on one side of one of said flanges and an annular liquid chamber on the other side of said flange, a cylinder in said piston forming a high pressure liquid chamber, and a secondary hollow piston connecting with the high pressure outlet and having a pair of spaced flanges provided with packing rings sliding on the walls of said cylinder in the first named piston.

NIELS A. CHRISTENSEN.